United States Patent [19]
Luker

[11] Patent Number: 5,518,672
[45] Date of Patent: May 21, 1996

[54] EXTRUSION SURGE CONTROLLER AND METHOD

[75] Inventor: Keith Luker, Little Falls, N.J.

[73] Assignee: Randcastle Extrusion Systems, Inc., Cedar Grove, N.J.

[21] Appl. No.: 358,601

[22] Filed: Jan. 23, 1995

Related U.S. Application Data

[63] Continuation-in-part of Ser. No. 250,909, May 31, 1994, Pat. No. 5,486,328.

[51] Int. Cl.⁶ ............................................. B29C 47/92
[52] U.S. Cl. .................... 264/40.1; 264/40.7; 264/176.1; 264/211.21; 264/349; 425/145; 425/149; 425/170; 425/208; 425/382.3
[58] Field of Search ...................... 264/349, 40.7, 264/211.21, 40.1, 176.1; 425/205–209, 204, 145, 149, 170, 382.3

[56] References Cited

U.S. PATENT DOCUMENTS

| | | |
|---|---|---|
| 3,023,455 | 3/1962 | Geier et al. . |
| 3,148,231 | 9/1964 | Spencer ................................ 264/40.7 |
| 3,632,256 | 1/1972 | Kasting et al. . |
| 3,704,972 | 12/1972 | Kneller et al. ...................... 264/40.7 |
| 3,706,827 | 12/1972 | Nott et al. ........................... 264/40.7 |
| 3,787,160 | 1/1974 | Leister ................................ 425/208 |
| 3,797,550 | 3/1974 | Latinen . |
| 3,802,670 | 4/1974 | Okada et al. . |
| 3,856,278 | 12/1974 | Eisenmann ........................ 425/209 |
| 3,924,841 | 12/1975 | Shinmoto . |
| 3,976,285 | 8/1976 | Johnson ............................. 264/176.1 |
| 4,118,163 | 10/1978 | Lee . |
| 4,336,213 | 6/1982 | Fox ..................................... 264/40.1 |
| 4,465,451 | 8/1984 | Adderley, Jr. . |
| 4,642,041 | 2/1987 | Murphy ............................... 425/208 |
| 4,689,187 | 8/1987 | Markel et al. . |
| 4,695,240 | 9/1987 | Li et al. . |
| 4,730,935 | 3/1988 | Kolossow . |
| 4,766,676 | 8/1988 | Shogenji et al. . |
| 4,966,539 | 10/1990 | Pena . |
| 5,106,286 | 4/1992 | Klein . |
| 5,215,374 | 6/1993 | Meyer . |
| 5,215,764 | 6/1993 | Davis et al. ........................ 425/208 |

FOREIGN PATENT DOCUMENTS 2413374  10/1975  Germany .............................. 425/207

OTHER PUBLICATIONS

"The Dynamic Behavior of Extruders," I. Patterson et al, 1978 ANTEC, pp. 483–487.
"Development of Computer Control Strategies for Plastic Extruders", J. Parnaby et al, *Polymer Engineering and Science*, Aug. 1975, vol. 15, No. 8, pp. 594–605.

Primary Examiner—Jeffery R. Thurlow
Attorney, Agent, or Firm—Austin R. Miller

[57] ABSTRACT

An apparatus is provided for extruding a polymer which is subject to periodic surges. The apparatus includes a barrel with an upstream portion for receiving polymer, a downstream portion and a discharge port near the downstream portion. The apparatus also includes a shaft mounted for rotational movement about a longitudinal axis within the barrel as well as drive means connected to rotate the shaft. The apparatus has a surge suppressor for urging polymer upstream toward the discharge port while permitting a portion of polymer to flow downstream into the surge suppressor. A sensor is positioned within the apparatus to detect surges in the polymer and a controller is connected to the sensor and to the drive means for adjusting shaft rotation in response to polymer surges.

4 Claims, 6 Drawing Sheets

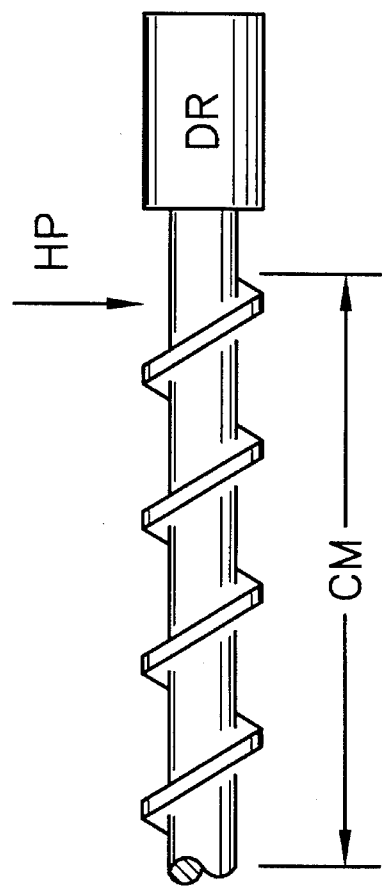
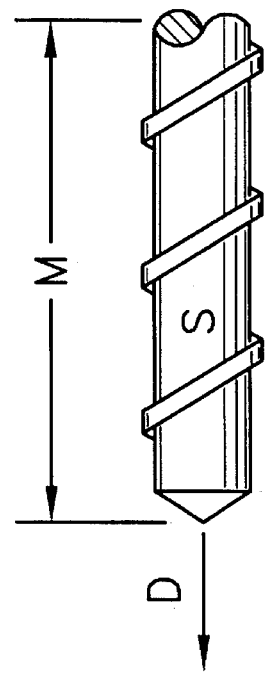
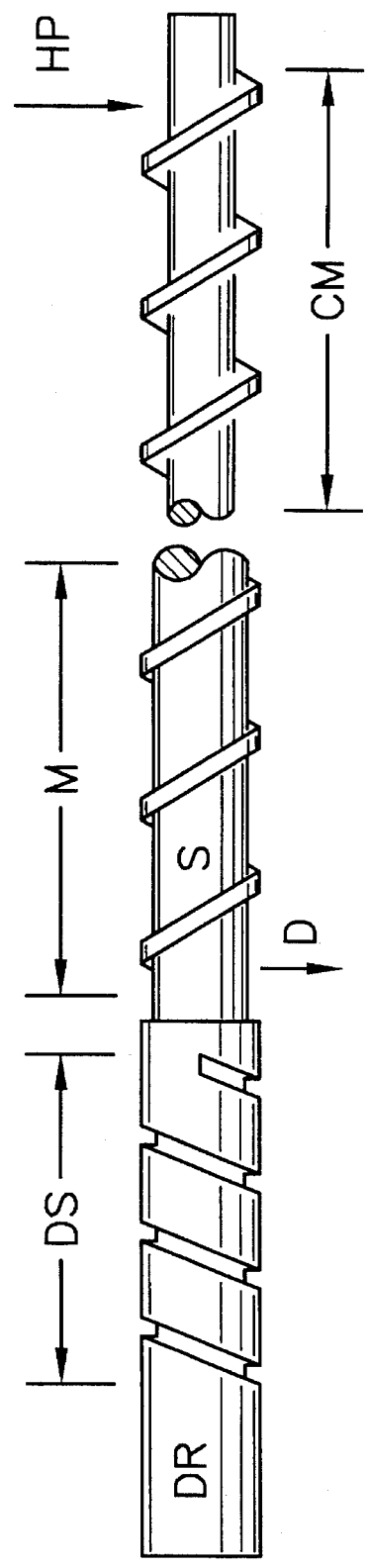
Fig. 1a PRIOR ART
Fig. 1b PRIOR ART

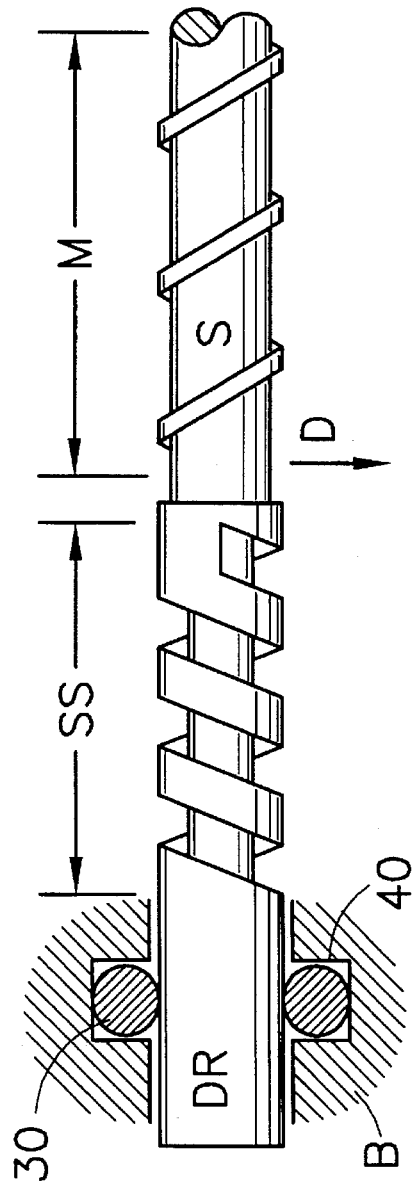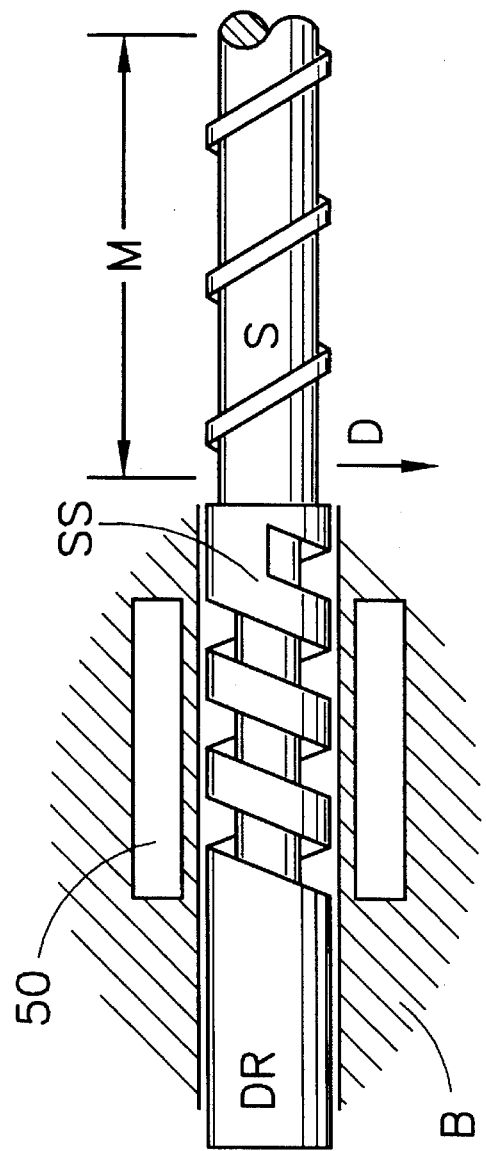

EXTRUSION SURGE CONTROLLER AND METHOD

This application is a continuation-in-part of application Ser. No. 08/250,909, filed May 31, 1994, now Pat. No. 5,486,328.

BACKGROUND OF THE INVENTION

This invention provides an apparatus for reducing or eliminating pressure and flow rate surges in polymer extrusion machines. It also relates to a method of extruding with a substantially constant polymer pressure. In particular, this invention provides an extrusion apparatus and method utilizing a surge suppressor incorporated into the extruder screw.

1. Field of the Invention

Surges within polymer extruders are recognized as a major problem faced by the extrusion industry. Surges are output variations from an extruder screw corresponding to variations in polymer pressure and changes in polymer flow rate. Accordingly, surges are nearly synonymous in the extrusion industry with pressure and flow variations. Put simply, surges are like waves wherein maximum output and pressure occur at the top of the wave and minimum output and pressure occur at the bottom of the wave. When a wave-like surge arrives at the discharge end of the extrusion screw, there will be a corresponding surge in discharge pressure and flow rate. Accordingly, an instantaneous pressure or flow rate surge will produce an instantaneous surge at the extrusion die.

Pressure and flow variations at the extrusion die are know to result in dimensional variations in the extruded product. Such dimensional variations create severe problems, especially when it is desired or necessary to extrude tube, rod or other shapes having tight tolerances. Dimensional variations may result in the extrusion of large quantities of expensive materials into useless products. Moreover, pressure and flow changes at the extrusion die cause dimensional variations along the length of an extrusion. Inspection of one portion of the extruded product may result in different results from other portions, reducing predictability. Dimensional and other variations resulting from polymer surging ultimately results in material waste, product rejection, and other inefficiencies.

Various attempts have been made to efficiently and effectively control variations in extruder output. For example, valve control of extruder output was considered in Patterson et al, *The Dynamic Behaviour of Extruders,* SPE ANTEC, pp. 483–487 (1978). Also, control of melt temperature and pressure by continuously varying screw speed coupled with infrequent variations in die resistance was considered in Parnaby et al, *Development of Computer Control Strategies for Plastic Extruders,* Polym. Eng. Sci., Volume 15, No. 8, pp. 594–605 (1975).

Pressure controllers have been used in conjunction with gear pumps to compensate for extrusion pressure fluctuations. Gear pumps are sometimes positioned between an extruder barrel and an extruder discharge. Such pumps generally have precise outputs as well as a fixed resistance at a particular speed. However, increased extruder output has been known to generate very high pressure between the extruder and gear pump, sometimes causing the pump gears to seize. By use of a pressure controller, extruder screw speed may be reduced in an attempt to compensate for pressure increases and raised to compensate for pressure reductions. Examples of such pressure controllers include those provided by Dynisco, Sharon, Mass. (Model No. 660) and Barber Coleman, Loves Park, Ill. (Model No. 940).

Pressure controllers frequently utilize a pressure sensor positioned near the gear pump. Controllers are generally adjusted to ignore short-term pressure fluctuations and to correct extruder screw speed in response to long-term pressure trends.

Pressure controllers used in conjunction with gear pumps sometime cause unstable pressures when they attempt to correct for small or sudden pressure fluctuation. There is inherently some delay between the sensing of a pressure fluctuation and the actual screw-speed change initiated by the controller due to instruction delay and system inertia (i.e., inherent inertia of the drive motor, drive belts, transmission and other system components). Delay causes the controller instruction to be out of phase with the pressure fluctuation and therefore makes the pressure fluctuation worse.

Pressure controller instability is aggravated by the chaotic and unpredictable nature of extrusion pressure fluctuations. Small pressure increases or decreases often do not indicate continuing pressure increases or decreases. Pressure fluctuations are often quite short in duration.

Lee, in U.S. Pat. No. 4,118,163, also recognized difficulties in controlling the uniformity of pumping zone pressure and attempted to minimize pressure and flow surges at the discharge end of an extruder. Lee provided a complicated screw extruder apparatus having two separate pumping zones, a first zone for feeding plastic from a hopper and a second zone for pumping plastic back toward the first zone and out a lateral exit orifice. The first and second zones were connected by a central bore formed in the second zone of the screw which communicated with the first zone through radial passageways. The Lee extruder was an expensive device requiring a highly specialized extruder screw.

These attempts failed to provide a practical and effective apparatus or method for reducing polymer surging. Accordingly, there is a great and thus far unsatisfied demand for a practical apparatus and method for reducing or eliminating surging of polymer in extrusion processes.

OBJECTS OF THE INVENTION

It is an object of this invention to provide an apparatus which overcomes the problems associated with conventional extruders.

It is another object of the invention to provide an apparatus for reducing or eliminating surges of polymer during extrusion processes.

It is another object of the invention to provide a surge suppressing extruder having an inexpensive and reliable means for reducing or eliminating surges before pressurized polymer reaches the extrusion die.

It is still another object of the invention to provide a method for reducing or eliminating surges known to occur in conventional extrusion processes.

It is a further object of the invention to provide a method for reducing or eliminating polymer surging by providing a modified extrusion screw together with a pressure controller.

Other important objects of the invention will become apparent to one of skill in this art in view of the following descriptions, the appended figures and the claims.

SUMMARY OF THE INVENTION

This invention provides an extruder having a barrel and a shaft mounted for rotation within the barrel. The shaft has a conveying screw flight for conveying and melting polymer pellets introduced into the barrel through a hopper. A metering screw flight meters the melted polymer and delivers the polymer to an extrusion die. A surge suppressing screw flight on the shaft downstream of the die urges polymer toward the die while permitting a portion of the polymer to flow into or past the surge suppressing screw flight. A seal is optionally provided near the surge suppressing screw flight to prevent further polymer flow.

The surge suppressor absorbs instantaneous pressure and flow increases. The surge suppressor also compensates for instantaneous pressure and flow drops. Accordingly, the surge suppressor dampens pressure and flow surges to maintain a substantially uniform pressure at the extrusion die.

The surge suppressor is optionally used in connection with a screw-speed controller. The surge suppressor permits improved controller performance with minimal controller adjustments.

This invention also provides a method for reducing or eliminating polymer pressure and flow surges during extrusion processes. A shaft of an extruder is provided with a surge suppressing screw flight. The surge suppressing screw flight generates a pressure less than or equal to the extruder metering screw and a portion of the pressurized polymer flows into the surge suppressing screw flight. A seal is optionally provided downstream of the surge suppressing screw flight to prevent further polymer flowing.

BRIEF DESCRIPTION OF THE DRAWINGS

FIGS. 1a and 1b are side views of conventional extrusion screws.

FIG. 5 is a side view of yet another form of extrusion screw embodying features of this invention.

FIG. 6 is a side view of still another form of extrusion screw embodying features of this invention.

DETAILED DESCRIPTION OF THE INVENTION

Figure 2:
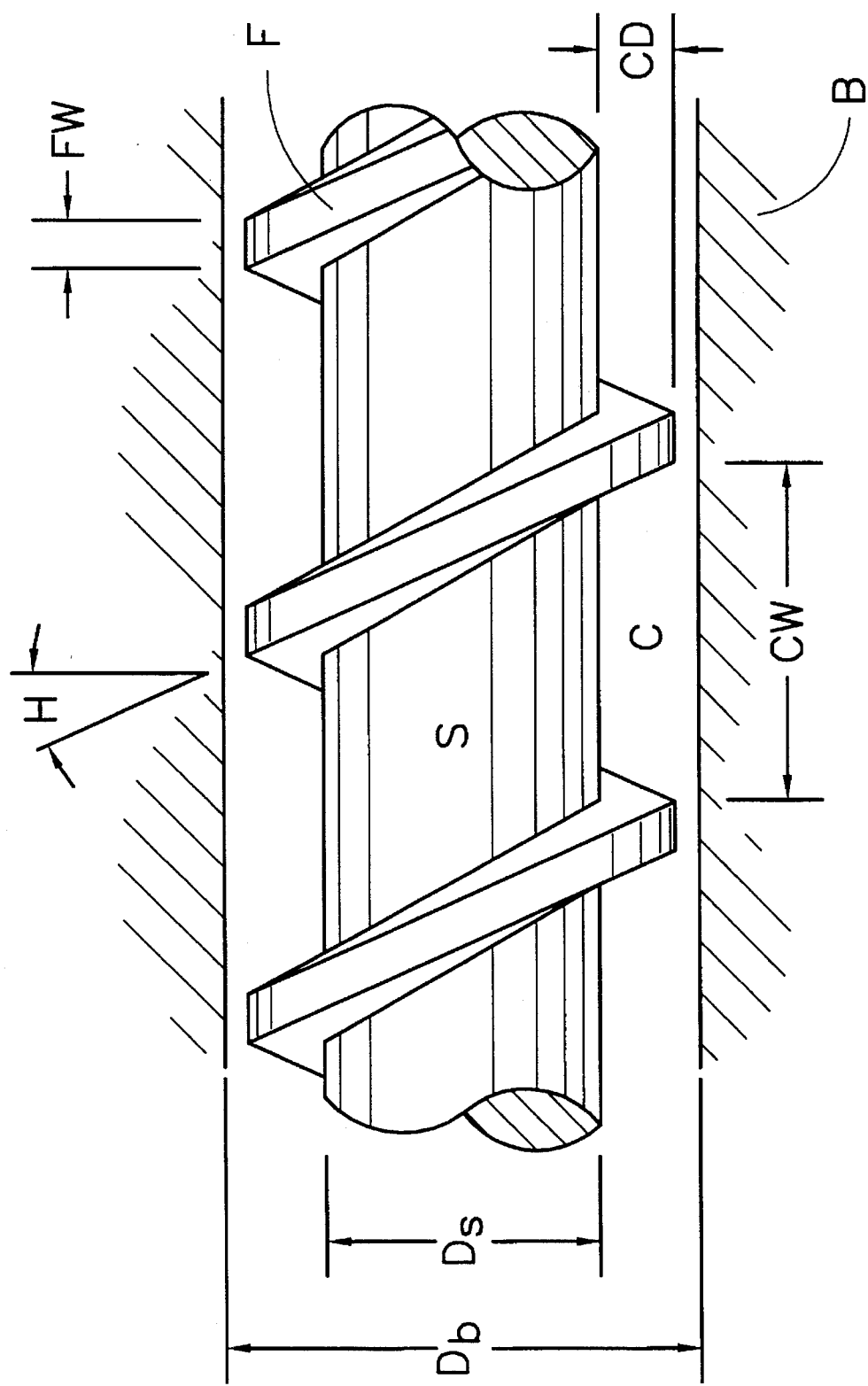
FIG. 2 is a side view of a segment of a conventional extrusion screw within a barrel.

The following description is intended to refer to the specific embodiments of the invention illustrated in the drawings. This description is not intended to define or limit the scope of the invention, which is defined separately in the claims that follow. Also, the drawings referred to throughout the following description are not to scale and are not intended to reflect actual dimensions or proportions.

FIGS. 1a and 1b are provided to illustrate features found in conventional extrusion screws utilized in conventional extruders. The extrusion screws shown in FIGS. 1a and 1b both have an upstream portion to the right and a downstream portion to the left.

Referring to FIG. 1a, an extrusion screw S is driven from a drive end DR located at the upstream end of extrusion screw S. Just downstream of drive end DR, hopper pellets HP are introduced into the extruder barrel (not shown) within which extrusion screw S is rotationally mounted. Hopper pellets HP are conveyed downstream and melted into molten polymer in conveying and melting zone CM. Melted polymer is then metered in metering zone M, sometimes referred to as a pumping zone, located downstream of conveying and melting zone CM. Melted polymer is then discharged to an extrusion die through an axial discharge D.

Surges in pressurized melted polymer occur within metering zone M in the form of pressure surges and flow surges. Such surges are caused, as described above, by extrusion screw rotation speed variations, variations in polymer temperature, variations in polymer supply, and other commonly encountered parameter changes. Such surges commonly result in pressure and flow rate surges at the extrusion die.

Referring to FIG. 1b, extrusion screw S is driven from a drive end DR at the downstream end of extrusion screw S. Hopper pellets HP are introduced into the barrel (not shown) and are conveyed and melted in conveying and melting zone CM at the upstream portion of extrusion screw S. Melted polymer is metered in metering zone M just upstream of a radial extrusion die discharge D.

In order to prevent pressurized polymer from flowing downstream of extrusion die discharge D and into a transmission mechanism (not shown) at drive end DR, a dynamic seal DS is provided downstream of extrusion die discharge D. Seals similar to dynamic seal DS, also known in the industry as seal screws or viscous seals, are commonly used on gear pumps and on some drum extruders. Dynamic seals are also used in internal mixers and vertical single screw extruders to keep polymer melt away from critical parts of process machinery.

Most extruders drive the extrusion screw from the end opposite the extrusion die. In other words, the extrusion screw begins at the transmission at an upstream portion and terminates in a point at the opposite, downstream end (see FIG. 1a). An example of such an extrusion screw was illustrated by Adderley, Jr., in U.S. Pat. No. 4,465,451.

Other extruders drive the extrusion screw from its downstream portion and have an extrusion die discharge between the upstream and downstream ends of the screw. This type of extrusion screw S is shown in FIG. 1b. An example of such an extruder was also illustrated by Li et al., in U.S. Pat. No. 4,695,240. Dynamic seals have been used in such extruders to prevent melted polymer from entering and fouling transmission mechanisms attached to drive the screw.

Referring to FIG. 1b, dynamic seal DS prevents polymer flow past extrusion die discharge D to drive end DR. Accordingly, dynamic seal DS is designed to maximize pressure so as to generate pressure greater than that developed in metering zone M. Because the pitch of the screw in dynamic seal DS is opposite that of metering zone M and the screw is designed to generate maximum pressure, dynamic seal DS pumps melted polymer back upstream to the extrusion die and seals against downstream polymer flow.

A variety of extrusion screws, many of which included dynamic or viscous seals, were disclosed in the following patents: Geier et al., U.S. Pat. No. 3,023,455; Kasting et al., U.S. Pat. No. 3,632,256; Latinen, U.S. Pat. No. 3,797,550; Okada et al., U.S. Pat. No. 3,802,670; Shinmoto, U.S. Pat. No. 3,924,841; Markel et al., U.S. Pat. No. 4,689,187; Kolossow, U.S. Pat. No. 4,730,935; Shogenji et al., U.S. Pat. No. 4,766,676; Pena, U.S. Pat. No. 4,966,539; and Klein, U.S. Pat. No. 5,106,286. The extrusion screw shown in U.S. Pat. No. 3,924,841, incorporated herein by reference, has a reverse thread portion which serves to force back the molten resin toward the mixing zone to prevent polymer leakage past the extruder screw shank.

FIG. 2 illustrates structural elements of conventional extrusion screws. Extrusion screw S has a flight F helically arranged at a helix angle H. Flight F is also known as a thread. Flight F has a flight width FW. The space between adjacent flights defines a channel C between extrusion screw S and an extruder barrel B. Channel C has a channel depth CD (sometimes known as thread depth) and a channel width CW. Extrusion screw S has a shaft diameter $D_s$ and extrusion screw S is sized to fit within barrel B having a barrel diameter $D_b$.

Rotation of extrusion screw S shown in FIG. 2 conveys polymer (not shown) in channel C in a downstream direction. For example, rotating extrusion screw S in a counter-clockwise direction from the right-hand side of FIG. 2 conveys polymer toward the left-hand side of FIG. 2.

Extrusion screws can of course be provided with a wide variety of dimensions, configurations and shapes. Meyer, in U.S. Pat. No. 5,215,374, illustrated a variety of extrusion screw shapes.

FIGS. 3a, 3b, 4a, 4b, 5 and 6 illustrate several embodiments of the extrusion surge suppressor according to this invention. This invention is not, however, limited to the embodiments illustrated in the figures, but instead is defined separately in the appended claims.

Figure 3A:
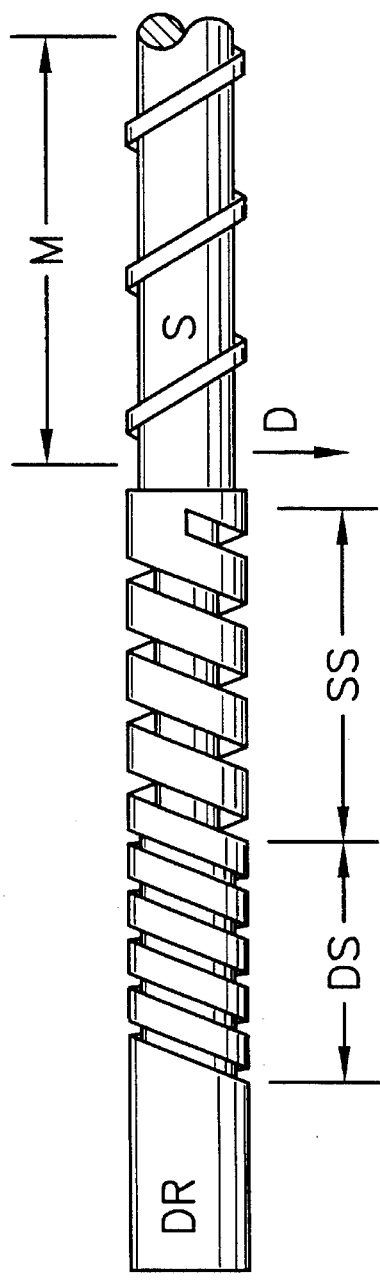
FIGS. 3a and 3b are side views of two forms of extrusion screws embodying features of this invention.

Referring to FIG. 3a, an extrusion screw is provided with a metering zone M downstream from a conveying and melting zone (not shown) into which hopper pellets are introduced. Downstream of metering zone M is a radially extending extrusion die discharge D. Farther downstream from extrusion die discharge D is a surge suppressor SS for suppressing melted polymer pressure and flow rate surges. Surge suppressor SS in this embodiment generates a polymer pressure less than that generated in metering zone M, thereby allowing some melted polymer to flow downstream through surge suppressor SS. Surge suppressor SS is in the form of a screw flight having a direction opposite to that in metering zone M. Accordingly, surge suppressor SS pumps a substamial portion of melted polymer back toward metering zone M and extrusion die discharge D. Details of a preferred surge suppressor SS are provided below.

A dynamic seal DS is provided on extrusion screw S downstream from surge suppressor SS. Dynamic seal DS seals against downstream flow of the melted polymer that passes through surge suppressor SS. Dynamic seal DS is formed from a helical groove cut into extrusion screw S in a direction opposite to the screw flights in metering zone M. Dynamic seal DS generates a high polymer pressure greater than that generated in metering zone M.

To generate high polymer pressure, dynamic seal DS is provided with a small helix angle H (FIG. 2), a shallow channel depth CD and/or a narrow channel width CW. Dynamic seal DS is preferably formed with a small axial length to permit a shorter extrusion screw S. Dynamic seal DS is provided with a helix angle H not exceeding about half that of metering zone M. Channel depth CD in dynamic seal DS does not exceed about half that of metering zone M. Also, the axial length of dynamic seal DS is less than or equal to about 25% that of metering zone M. Finally, channel width CW in dynamic seal DS does not exceed about 10% of the screw diameter. A dynamic seal DS so designed generates a pressure much greater than metering zone M and prevents flow of melted polymer to the drive end DR of extrusion screw S and into the screw drive mechanism (not shown) attached to drive end DR.

Figure 3B:
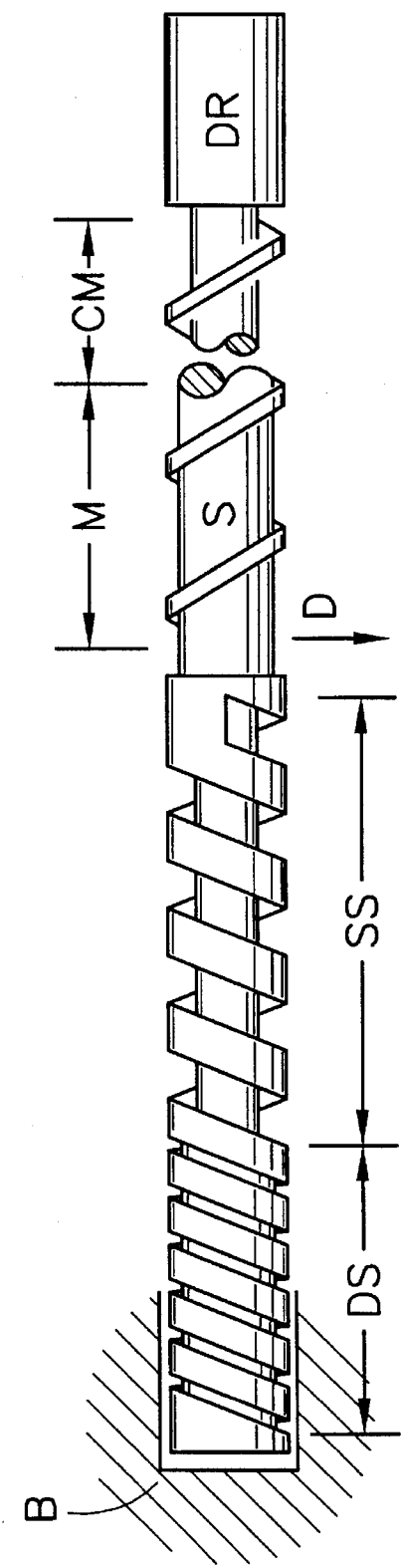

Referring to FIG. 3b, an extrusion screw S is similar to that shown in FIG. 3a except that extrusion screw S is driven from a drive end DR at the upstream end of extrusion screw S. Drive end DR is provided upstream from a conveying and melting zone CM into which hopper pellets (not shown) are introduced. Downstream from conveying and melting zone CM is a metering zone M for metering melted polymer and delivering the polymer to a radially extending extrusion die discharge D. Downstream from extrusion die discharge D is a surge suppressor SS similar to that described with reference to FIG. 3a. As in FIG. 3a, the surge suppressing screw embodiment shown in FIG. 3b has a dynamic seal DS located downstream from surge suppressor SS. Dynamic seal DS has a structure similar to that described with reference to FIG. 3a. Dynamic seal DS prevents downstream flow of melted polymer that flows through surge suppressor SS. Accordingly, dynamic seal DS prevents flow of pressurized melted polymer downstream into downstream portions of barrel B.

FIGS. 3a and 3b both illustrate embodiments having a surge suppressor permitting downstream flow of some polymer with a dynamic seal which seals against farther downstream flow. FIG. 3a shows such an embodiment driven from a downstream end of the extrusion screw. FIG. 3b shows an embodiment wherein the extrusion screw is driven from its upstream end.

Figure 4A:
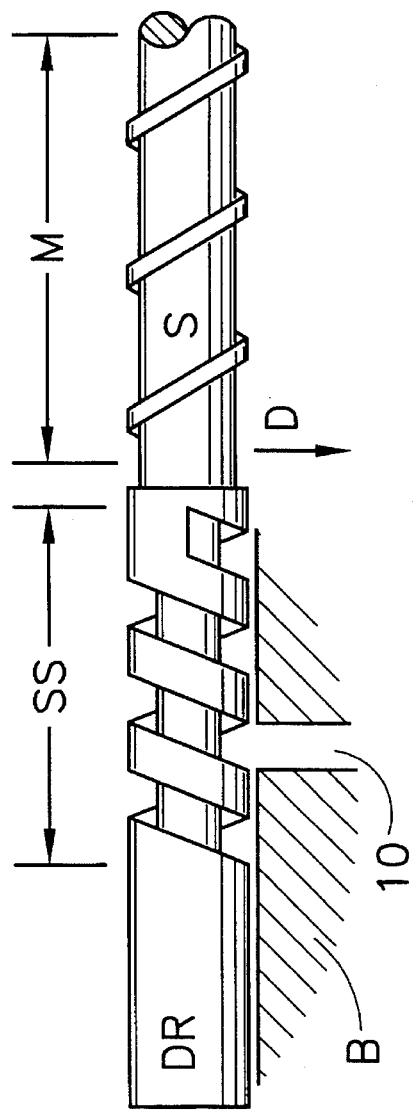
FIG. 4a and 4b are side views of two more forms of extrusion screws embodying features of this invention.

Referring to FIG. 4a, another extrusion screw embodiment is provided with a metering zone M downstream from a conveying and melting zone (not shown) into which hopper pellets are introduced. Metering zone M meters melted polymer and delivers it to a radially extending extrusion die discharge D. Downstream from extrusion die discharge D is a surge suppressor SS similar to those shown in FIGS. 3a and 3b. Surge suppressor SS pumps a portion of the melted polymer back upstream toward metering zone M and extrusion die discharge D. Surge suppressor SS also permits downstream flow of a portion of melted polymer.

The portion of melted polymer that flows downstream past surge suppressor SS exits barrel B through a radially extending polymer discharge port 10. Radial discharge port 10 may also take the form of a bleed hole for the escape of small amounts of melted polymer. Radial polymer discharge port 10 optionally leads to a restriction valve (not shown) or any other known means of restricting melted polymer flow. Discharge of the portion of polymer that passes downstream through surge suppressor SS and out port 10 prevents fouling of transmission mechanisms at a drive end DR at the downstream end of extrusion screw S.

Figure 4B:
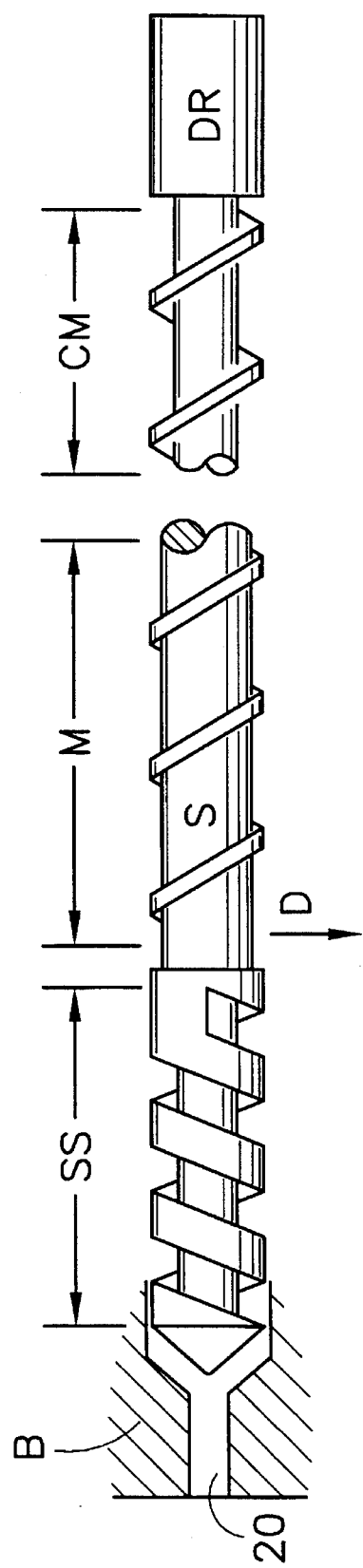

Referring to FIG. 4b, an extrusion screw S similar to that shown in FIG. 4a is shown, differing mainly in that extrusion screw S in FIG. 4b is driven from a drive end DR at the upstream end of extrusion screw S. Downstream from drive end DR is a conveying and melting zone CM into which hopper pellets are introduced. Melted polymer is metered in a metering zone M downstream from conveying and melting zone CM for delivery to a radially extending extrusion die discharge D. Downstream from extrusion die discharge D is a surge suppressor SS similar to that shown in FIG. 4a.

The portion of melted polymer that flows downstream through and past surge suppressor SS exits barrel B through an axial polymer discharge 20. Axial polymer discharge port 20 optionally terminates at a restriction valve or other known restriction device. Port 20 may also be referred to as a bleed hole. Accordingly, the small portion of melted polymer that flows downstream from surge suppressor SS exits the extruder through port 20 while the majority of melted polymer exits extrusion die discharge D upstream from surge suppressor SS.

FIGS. 4a and 4b both show extrusion screw embodiments wherein a surge suppressor which permits downstream passage of melted polymer is provided in conjunction with a bleed hole and optional restriction device. FIG. 4a shows an embodiment having a surge suppressor combined with a radially extending bleed hole. FIG. 4b shows an embodiment having a surge suppressor combined with an axially extending bleed hole.

Referring to FIG. 5, yet another embodiment of an extrusion surge suppressor according to this invention is illustrated. This embodiment provides an extrusion screw S having a metering zone M downstream from a conveying and melting zone (not shown) which supplies melted polymer. Metering zone M meters and delivers pressurized polymer to a radially extending extrusion die discharge D. Downstream from extrusion die discharge D is a surge suppressor SS. Surge suppressor SS pumps some melted polymer back upstream toward metering zone M and extrusion die discharge D while permitting a portion of melted polymer to flow farther downstream through surge suppressor SS.

An O-ring 30 is captured within an O-ring groove 40 formed in barrel B. O-ring 30 prevents downstream flow of the melted polymer that passes through surge suppressor SS. O-ring 30 is preferably formed from any known elastomeric material. Whatever material is selected, however, O-ring 30 should be capable of withstanding the elevated temperatures maintained during extrusion processes.

O-ring 30 provides a circumferential seal against an outermost surface of O-ring groove 40 and a circumferential seal against the surface of extrusion screw S. These seals provided by O-ring 30 prevent passage of melted polymer to the drive end DR of extrusion screw S, thereby preventing fouling of any transmission mechanism attached to drive end DR.

The extrusion surge suppressor embodiment shown in FIG. 5 has a surge suppressor in combination with an O-ring seal which seals-off the polymer that flows through the surge suppressor. It is of course contemplated (although not shown) that the screw in FIG. 5 could also be driven from a drive end located at the upstream end of the screw. It is also contemplated that any other known mechanical seal device can be substituted for O-ring 30 and O-ring groove 40.

Referring to FIG. 6, an extrusion screw S is again provided with a metering zone M which receives melted polymer from a conveying and melting zone (not shown). Metering zone M meters and delivers pressurized and melted polymer to radially extending extrusion die discharge D. Downstream from extrusion die discharge D is provided a surge suppressor SS similar to that shown in FIG. 5. Surge suppressor SS pumps a portion of melted polymer back towards metering zone M and out extrusion die discharge D. Another portion of the melted polymer flows downstream through at least a portion of surge suppressor SS.

A coolant reservoir 50 is provided within barrel B at a position which preferably overlaps with surge suppressor SS on extrusion screw S. Coolant is circulated through coolant reservoir 50 to cool the melted polymer in a portion of surge suppressor SS. As the melted polymer is cooled, it tends to prevent farther downstream flow. Accordingly, the portion of melted polymer which flows downstream through a portion of surge suppressor SS is sealed against flowing farther downstream, thereby preventing fouling of screw transmission mechanisms attached at drive end DR.

The embodiment shown in FIG. 6 illustrates the combination of a surge suppressor with polymer cooling to reduce or eliminate polymer surging while preventing polymer leakage. It is of course contemplated that drive end DR could also be located at the upstream end of extrusion screw S. It is also contemplated that coolant reservoir can be substituted for any known cooling means, including but not limited to a coiled coolant flow passage or even convection cooling induced by air flow around or through the extruder barrel. Also, coolant reservoir 50 or any other known cooling means can be positioned to coincide with surge suppressor SS, can overlap with surge suppressor SS or can be positioned downstream of surge suppressor SS.

Operation of the extrusion surge suppressor according to this invention will now be described with reference to FIGS. 2 and 3a. In essence, the surge suppressor portion of the extrusion screw provides a uniform output pressure at the extrusion die by absorbing surges in polymer pressure and flow rate. In conventional extruders, surges are known to occur when the extruder speed is increased or when other extrusions parameters such as temperature are varied. Such changes result in fluctuations in output. Accordingly, in conventional extruders, any change in extruder output is transmitted directly to the extruder die, thereby causing the severe disadvantages described above.

The extrusion surge suppressor of this invention eliminates the peaks and valleys of wave-like surges to provide an output that is uniform. More specifically, the surge suppressor acts to store surging polymer associated with pressure or flow rate increases so that excess polymer does not travel directly from the metering zone to the extrusion die. Accordingly, the surge suppressor absorbs the surge while preventing transmission of the surge directly to the extrusion die. When, on the other hand, the surge represents a pressure drop or flow reduction, the surge suppressor gives up some of its stored polymer to the extrusion die discharge to even-out the die output.

The surge suppressor is preferably formed with a length sufficient to allow molten polymer pressure generation approaching that of the metering zone. The surge suppressor's ability to generate pressure increases with length. As polymer enters the surge suppressor (pushed into the surge suppressor by pressure generated in the metering zone), the pressure in the surge suppressor approaches the pressure in the metering zone. Accordingly, a surge of molten polymer flows into the surge suppressor before it reaches the discharge die.

It is believed that the function of the surge suppressor and method according to this invention is founded upon fundamentals of polymer flow. In a steady state the drag flow of polymer in the surge suppressor relates to the pressure flow of the polymer according to the following equations:

$$\frac{1}{2}(CW)(CD)v_{sb} \qquad (1)$$

$$\frac{(CW)(CD)^3 P}{12 \mu z} \qquad (2)$$

wherein quantity (1) is polymer drag flow in the surge suppressor and quantity (2) is polymer pressure flow. CW and CD are defined in FIG. 2. P is the pressure developed in the screw metering zone, z is the helical length over which pressure P is developed in the surge suppressor, and $v_{sb}$ is the relative velocity between the extruder screw and extruder barrel. In steady state operation of the surge suppressor, drag flow and pressure flow are approximately equal:

$$1/2(CW)(CD)v_{sb} \approx \frac{(CW)(CD)^3 P}{12 \mu z} \qquad (3)$$

According to relationship (3), there is an increase in flow into the surge suppressor whenever an instantaneous pressure increase occurs at the surge suppressor entrance. This flow increase causes an increase in filled length z. If the pressure increase is maintained for sufficient time, a new equilibrium will be reached with the new filled length z until drag flow is again proportional to pressure flow.

If molten polymer is presumed to be incompressible, an instantaneous pressure surge will be accompanied by an instantaneous flow rate increase. Such an instantaneous flow rate surge is absorbed by the surge suppressor of this invention. The initial flow surge into the surge suppressor is large and then gradually tapers. Accordingly, initial flow increase into the surge suppressor immediately reduces flow into the die, thereby reducing output variations at the extrusion die. In other words, a step change in pressure or flow rate in the metering zone will not produce a step change in the discharge pressure or flow rate at the extrusion die when a surge suppressor according to this invention is used.

If the duration of the surge is very short (less than five seconds, for example), flow into the surge suppressor and pressure in the extrusion die will still be building before the surge ends. Accordingly, pressure and flow will start to reduce even before a new steady state is reached and the amplitude of the pressure and flow surge is dramatically reduced or eliminated.

It has been discovered that it is easiest to suppress surges when the time required for flow into the surge suppressor to reach equilibrium ($\Delta t_{eq}$) is longer than the time duration of the surge ($\Delta t_{surge}$). For example, surges having a duration as long as an hour can be limited by pressure feedback control. Accordingly, it is most preferable to design the surge suppressor according to this invention for reduction of short-term surges lasting only a few seconds.

Surge suppressors according to this invention are preferably designed to maximize polymer volumetric capacity so as to absorb larger pressure and volumetric surges. This is preferably accomplished by adjusting the flights in the surge suppressor by optimizing channel width CW, channel depth CD, and helix angle H (FIG. 2).

Surge suppressors according to this invention generate less pressure than dynamic seals, such as the one described above with reference to FIG. 3a, which are intended to seal against polymer flow. As compared to dynamic seals, the surge suppressor of this invention will have a greater helix angle H (FIG. 2), a greater channel depth CD and/or a wider channel width CW.

Wider channels provide increased polymer storage capacity during a surge. Increased polymer storage capacity also allows the surge suppressor to pump back into the extrusion die a greater volume of polymer during a pressure or flow rate drop. Another advantage of wider surge suppressor channels is that the overall axial length of the surge suppressor can be made smaller (because fewer channels are required) and allows the manufacture of a small extruder. Accordingly, the channel width of the preferred surge suppressor embodiment is greater than about 10% of the screw diameter. Referring to FIG. 2, channel width CW in the surge suppressor is preferably greater than about 10% of barrel diameter $D_b$.

The most preferable surge suppressor according to his invention generates lower pressures than that generated in the metering zone. Lower pressure generation maintains continuous flow of molten polymer downstream through the surge suppressor. Such continuous flow replenishes molten polymer in the surge suppressor, thereby preventing polymer degradation and burning. As described above, the flow of molten polymer downstream from the surge suppressor can be stopped with any sealing method or simply allowed to flow from the extruder barrel. To achieve these benefits, the preferred surge suppressor embodiment generates a pressure less than the metering zone and, most preferably, will only be capable of generating a pressure up to approximately 95% of the pressure generated in the metering zone.

A surge suppressor according to this invention is preferably formed with a helix angle H (FIG. 2) larger than that of the dynamic seal in FIG. 3a, or greater than about half that of the metering zone screw flight. Helix angle H of the surge suppressor is most preferably slightly larger than the helix angle H in the metering zone. Where the other surge suppressor dimensions coincide with those in the metering zone, the preferred surge suppressor embodiment has a helix angle H about 10% larger than the metering zone. Such a helix angle has been discovered to generate a maximum pressure of about 90% the pressure generated in the metering section if the other dimensions are the same.

A surge suppressor according to this invention preferably has a channel depth CD larger than that of the dynamic seal in FIG. 3a, or greater than about half that of the metering zone. If helix angle H were the same as in metering zone M, the most preferred surge suppressor would have a channel depth CD about twice that in the metering zone. Such a channel depth CD has been discovered to generate about 25% the pressure generated in the metering zone.

The axial length of the surge suppressor according to this invention is preferably greater than that of the dynamic seal of FIG. 3a, or greater than about 25% that of the metering zone. However, axial length of the surge suppressor is also preferably less than that of the metering zone. If channel depth CD and helix angle H were both the same in the surge suppressor as in the metering zone, reducing the surge suppressor length to about 95% of the metering zone length would generate about 95% of the metering zone pressure.

Of course, any combination of channel depth CD, channel width CW, surge suppressor length and helix angle H can be used so long as the surge suppressor retains its surge suppressing function. However, it is most preferable that the surge suppressor is not designed to generate more than about 95% of the metering zone pressure.

In any embodiment, the surge suppressor according to this invention provides significant benefits. The surge suppressor dramatically reduces or eliminates pressure and volumetric surges commonly known to occur in conventional extruders. The surge suppressor prevents these surges from transferring directly to the extrusion die, thereby reducing or eliminating variations in extruder product dimensions and quality.

These surprising and significant benefits are conferred without disadvantage. The continuous flow of molten polymer through the surge suppressor prevents degradation or burning of the polymer. Also, the surge suppressor can be provided without requiring a significant increase in extruder length. Accordingly, the surge suppressor and method according to this invention provides a simple, effective and practical solution to the longstanding problem of surging in extruders.

It has also been discovered that surprising benefits are obtained when a surge suppressor according to this invention is used in combination with a pressure controller designed to vary screw speed to compensate for pressure variations sensed near an extruder gear pump, such as those described herein under "Field of the Invention." The surge suppressor has been discovered to improve pressure controller performance.

Furthermore, it has been discovered that use of a surge suppressor according to this invention makes it possible to utilize a pressure controller to reduce surging in extruders without gear pumps. It is speculated that this surprising benefit results from several factors. The surge suppressor reduces or eliminates short duration pressure surges that often cause a pressure controller to over-compensate. Also, it is speculated that surge suppressors perform dynamically and react immediately to pressure surges as they occur, no matter what their cause may be, to help the controller regulate pressure. Surge suppressors are also presumed to dampen over-compensating responses of the pressure controller.

The following Example illustrates specific benefits of the invention. This Example is not intended to define or limit the scope of the invention, which is defined separately in the claims that follow.

EXAMPLE

Figure 7:
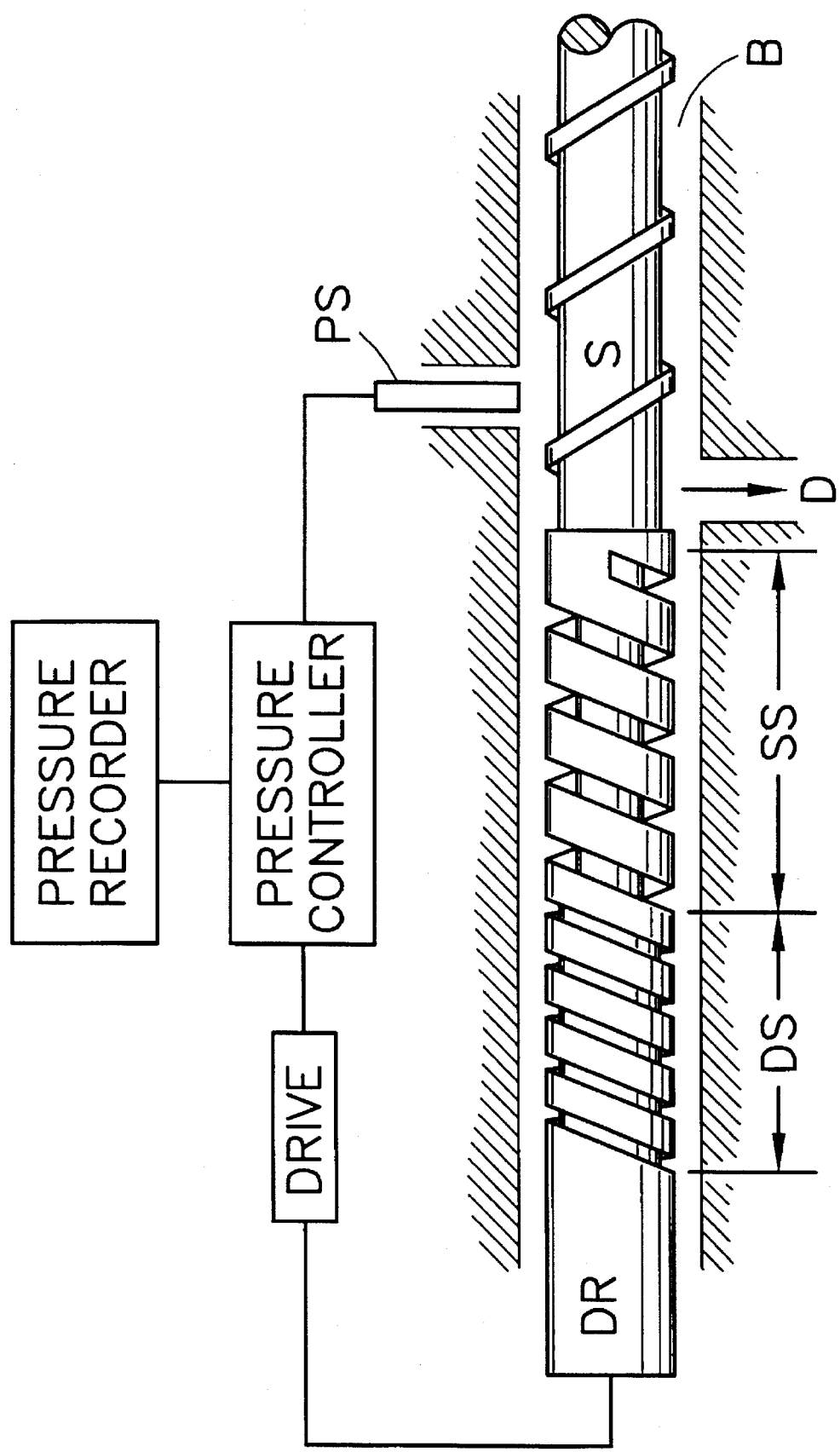
FIG. 7 is a schematic view of an extrusion system embodying features of this invention.

An experiment was performed using the extruder shown schematically in FIG. 7. A pressure controller (Model No. 660, supplied by Dynisco) utilizing a simple tach feedback DC motor control was connected to the drive end DR of extrusion screw S having a dynamic seal DS and a surge suppressor SS. The pressure controller was also connected to a pressure sensor PS mounted in the barrel B of the extruder near the discharge D where pressures are most unstable. A pressure recorder was also connected to monitor and record pressure within the barrel. The extruder did not include a gear pump.

The barrel pressure was monitored for a period of one hour without operation of the pressure controller. A narrow pressure range of 1,350 to 1,450 psi was recorded during that one-hour period. The barrel pressure was substantially evenly divided about a mid-point pressure of 1,400 psi. Occasional pressure spikes were also evenly divided about this 1,400 psi mid-point, including five short peaks to 1,450 psi and six short troughs to 1,350 psi.

The pressure controller was then actuated to vary extrusion screw speed in response to pressure variations. A pressure range of 1,350 to 1,400 was recorded. Accordingly, actuation of the pressure controller reduced the barrel pressure range from 100 psi to 50 psi. The pressure in the barrel mostly resided between 1,350 psi and 1,380 psi. There were several short-term peaks raising the pressure to 1,400 psi, but there were no troughs.

The record of barrel pressure during pressure controller actuation also indicated intervals wherein the pressure range was reduced to 25 psi. It was also noted that intervals included highly stable barrel pressures including only short-term "spikes" deviating substantially equally on both sides of the stable pressure.

It is anticipated that these surprising results could even be improved by optimizing the interactive set points of the pressure controller. Also, the pressure controller performance could be further improved by using more accurate and faster types of motor control for the extruder.

Many modifications to the surge suppressor embodiments described herein can be made without departing from the spirit and scope of this invention. For example, instead of forming helical grooves in the extrusion screw to produce the surge suppressor, a surge suppressing result can be produced by creating helical grooves in the cylindrical housing or barrel. Also, the surge suppressor is optionally a separately driven component. It is the relative motion between the shaft and the barrel that creates the important pumping effect of the surge suppressor.

Also, more than one bleed hole can be provided for the embodiments shown in FIGS. 4a and 4b and any known conventional seal or restriction device can be used in conjunction with the surge suppressor in any embodiment. Of course, multiple seals can be used in combination if desirable or necessary. For example, a dynamic seal can be used in conjunction with polymer cooling.

It is also contemplated that bleed holes 10 and 20 (FIGS. 4a and 4b, respectively) may also communicate with a flexible membrane covering the hole or a piston inserted into the hole as opposed to other forms of restriction device. Such a flexible membrane or piston could provide some additional surge reduction and/or sealing capability.

The screw dimensions and configuration can be varied in any way in any combination in the surge suppressor so long as the surge suppressing function is maintained. It is also contemplated that the channel width CW, channel depth CD and helix angle H may vary over the surge suppressor's length. Although the shaft diameter Ds is preferably constant throughout the surge suppressor, shaft diameter Ds (FIG. 2) may optionally be tapered.

The surge suppressor according to this invention is optionally used in combination with an extruder controller in a variety of ways to stabilize extrusion pressure and reduce or eliminate pressure surges. It is contemplated that any known type of extruder controller can be used in conjunction with a surge suppressor. Also, a pressure-type extruder controller optionally monitors pressure via a sensor mounted in the barrel, the transfer pipe ahead of the die, or at any other desired location. The extruder controller optionally monitors polymer pressure, extruded product dimensions, polymer flow rate, or any other parameter related to extrusion pressure.

Many other modifications will be apparent to those of skill in the extrusion art. Such modifications are within the scope of this invention, which is defined in the following claims.

What is claimed is:

1. An apparatus for extruding a polymer which is subject to periodic surges of pressure or flow rate, said apparatus comprising:

a barrel having an upstream portion for receiving said polymer, a downstream portion and a discharge port proximal said downstream portion;

a shaft mounted for rotational movement about a longitudinal axis within said barrel, said shaft having a screw flight positioned upstream from said discharge port and arranged for urging said polymer downstream through at least a portion of said barrel;

drive means connected for rotating said shaft;

a surge suppressor connected to said shaft including a reverse screw flight on said shaft and located downstream of said discharge port for urging said polymer upstream toward said discharge port while permitting a portion of said polymer to flow in a downstream direction into said surge suppressor, said reverse screw flight of said surge suppressor being capable of generating a pressure less than or substantially equal to a maximum pressure generated in said screw flight;

sealing means located downstream of said surge suppressor;

a sensor positioned to detect said surges of said polymer; and a controller connected to said sensor and to said drive means for adjusting said rotational movement of said shaft in response to said surges of said polymer.

2. The apparatus described in claim 1, wherein said sensor monitors polymer pressure to detect said surges.

3. The apparatus described in claim 2, wherein said sensor monitors said polymer pressure in said barrel.

4. A method for extruding a polymer using an extruder having a barrel, a shall mounted for rotation within said barrel, and a discharge, said method comprising the steps of:

urging polymer through said barrel and toward said discharge with a screw flight on said shaft;

generating a polymer pressure and a polymer flow rate;

suppressing surges in said polymer pressure or said polymer flow rate by generating a suppressing pressure less than or equal to a maximum polymer pressure with a reverse screw flight .positioned on said shaft downstream of said discharge;

sealing against flow of polymer downstream of said reverse screw flight;

monitoring said polymer pressure or said polymer flow rate;

controlling said polymer pressure or said polymer flow rate by adjusting said rotation of said shaft to compensate for said surges in said polymer pressure or said polymer flow rate; and directing said polymer from said barrel and through said discharge.

\* \* \* \* \*

UNITED STATES PATENT AND TRADEMARK OFFICE
CERTIFICATE OF CORRECTION

PATENT NO. : 5,518,672
DATED : May 21, 1996
INVENTOR(S) : Keith Luker

It is certified that error appears in the above-indentified patent and that said Letters Patent is hereby corrected as shown below:

In Column 13, line 9, please change "shall" to --shaft--.

Signed and Sealed this

Twenty-seventh Day of August, 1996

Attest:

BRUCE LEHMAN

Attesting Officer

Commissioner of Patents and Trademarks